United States Patent
Garner et al.

[11] 3,784,152
[45] Jan. 8, 1974

[54] PROCESS OF PRODUCING A COMPOSITE MOLD HAVING COOLING PIPES EMBEDDED THEREIN

[75] Inventors: Paul Johnson Garner, Thorp Bay; Thomas Robert Stephen Collins, Letchworth, both of England

[73] Assignee: Imperial Chemical Industries Limited, London, England

[22] Filed: Apr. 24, 1972

[21] Appl. No.: 246,926

Related U.S. Application Data

[63] Continuation-in-part of Ser. No. 885,172, Dec. 15, 1969, abandoned.

[52] U.S. Cl............. 249/80, 29/527.2, 29/DIG. 39, 164/19, 204/20, 204/38 E, 425/DIG. 30
[51] Int. Cl. ............................................. B29c 1/02
[58] Field of Search ...................... 204/6, 9, 15, 20, 204/38 B, 38 E; 264/225, 227; 164/6, 15, 19, 46; 29/527.2, 527.3, DIG. 39, DIG. 12, DIG. 1; 425/DIG. 30; 249/80

[56] References Cited
UNITED STATES PATENTS

| | | | |
|---|---|---|---|
| 1,935,916 | 11/1933 | Ragsdale | 164/46 X |
| 2,317,597 | 4/1943 | Ford et al. | 425/407 |
| 3,101,065 | 8/1963 | Kalis | 264/225 UX |
| 3,424,635 | 1/1969 | Grandinetti et al. | 204/6 X |
| 3,690,103 | 9/1972 | Dederra et al. | 204/9 X |
| 1,834,763 | 12/1931 | Bonsieur | 204/6 X |
| 3,077,647 | 2/1963 | Kugler | 164/19 |
| 1,357,343 | 11/1920 | Novotny | 249/80 X |
| 2,793,177 | 5/1957 | Fourier | 204/20 X |
| 3,498,371 | 3/1970 | Zygiel | 29/DIG. 1 |

Primary Examiner—Richard J. Herbst
Assistant Examiner—D. C. Reiley, III
Attorney—Cushman, Darby & Cushman

[57] ABSTRACT

Producing a mould by spraying a metal shell around a model, attaching pipes to the shell with a metal filled epoxy resin and subsequently backing the shell with a reinforcing material to enable the shell to be used in moulding, the method of attaching the pipes being such that no air pockets are formed in the region of the underside of the pipes adjacent the shell after the reinforcing material has been applied.

38 Claims, 5 Drawing Figures

PROCESS OF PRODUCING A COMPOSITE MOLD HAVING COOLING PIPES EMBEDDED THEREIN

This application is a continuation-in-part application of our U.S. Pat. application Ser. No. 885 172 filed Dec. 15, 1969, now abandoned. The present invention relates to a process for the production of moulds and to the moulds so produced. In particular the present invention relates to moulds for the production of articles from thermoplastic materials, especially moulds suitable for injection moulding.

According to the present invention we provide a process for making moulds or mould halves comprising a) forming a shell of metal around a model of the article to be moulded, b) adhering heating or cooling pipes to the metal shell using a metal filled epoxy resin as adhesive by pressing each pipe along its length into a layer of uncured metal filled epoxy resin deposited on at least the portion of said shell to which said each pipe is applied and building up a wall of uncured metal filled epoxy resin against each side of each pipe, and c) applying to said shell a reinforcing material to form a reinforcing backing on said shell with said pipes and metal filled epoxy resin encased in the reinforcing backing (except at the ends of the pipes which are exposed) with the exclusion of air pockets adjacent the metal shell.

We prefer that the shell is at least 1/16 inch thick.

The present invention also provides moulds whenever made by this process.

Our invention is particularly suitable for the production of moulds which are used in injection moulding. These moulds are generally known as split moulds and are made in two halves which may be made separately by the process of the present invention and then located together. Alternatively one mould half may be made by the process of this invention, a model of the article to be moulded placed in the first half and the metal shell of the other half formed around the model preferably by metal spraying. It is then necessary to back the two mould halves and ensure that they are in register with each other when mounted in the backing material.

The model of the article to be moulded may be made in any required manner and may be of any suitable material providing it is not adversely affected during the steps of the present invention. The model may be made of wood, metal, plaster, synthetic thermoplastic, thermosetting resins, rubber especially silicone rubber, wax, plasticine, clay or glass reinforced polyester resin. We prefer that the model be mounted on a wood or metal base which has angled edges which provides means of keying the sprayed metal coating around the model, as is described in our U.S. Pat. No. 3 638 299. The model itself should preferably contain cooling pipes which should be fixed as close to the surface to be sprayed as possible. When the metal shell is produced by flame spraying we prefer that the model is sprayed with a water soluble release agent such as polyvinyl alcohol before spraying with metal. The release agent allows the metal shell to be parted readily from the model when immersed in water and also assists in the satisfactory laying down of the initial coating of the sprayed metal.

The metal shell may be formed around the model by electro-deposition, casting of metal, from sheet metal or by metal spraying. Any metal from which a shell can be formed around the model may be used but we prefer that if the shell is formed by flame spraying it is of zinc. Low shrinkage alloys particularly alloys of bismuth and tin are suitable for compressed air spraying. These techniques provide a true reproduction of the model surface. A flame sprayed shell can be entirely of zinc or a minimum thickness of 0.050 inch of zinc backed by a low carbon steel, copper or aluminum. If metal spraying techniques are used aluminum is another particularly suitable material as it is lighter, has less tendency to crack and is readily sprayed at a high rate, i.e., metal deposited per minute. A metal thickness of between one-sixteenth inch and one-quarter inch is preferred in the process of this invention.

After the production of the metal shell, pipes, preferably of copper, should be attached to the back of the metal shell, so that they follow the contours of the shell in a predetermined cooling or heating plan. The outer diameter of such pipes is usually within the range one-quarter inch to three-eighths inch. We have found that if the pipes are fixed to the metal shell the mould can be kept effectively cool during injection moulding cycles as the metal filled epoxy resin allows particularly good heat exchange between the mould walls and a coolant flowing in the pipes. In an alternative embodiment the pipes can be attached to the metal shell with a metal filled epoxy resin and then more firmly adhered to the shell by further metal spraying to cover the pipes. This further metal layer also provides more reinforcement to the intially formed shell. If desired thermocouples may be stuck on to the metal shell with epoxy resin and this has the distinct advantage that they are in close proximity of the mould face. The metal shell should now be backed with a reinforcing material to enable it to be used in moulding operations.

It is essential in our process to attach the heating or cooling pipes to the formed metal shell in such a way that voids (i.e., pockets of air) are not formed in the region of the underside of the pipes when the shell is subsequently backed with a reinforcing material. The presence of such air pockets must always be avoided because the shell of the finished mould will cave into the pockets when the mould is used in an injection moulding cycle, owing to the extremely high pressures generated inside the mould in such a process. Even in lower pressure moulding processes such as blow moulding, there would always be the danger of the shell collapsing into the air pockets. In addition, the presence of air pockets may deleteriously affect the transfer of heat to or from the medium flowing in the pipes. Thus the simple and known process of attaching a pipe comprising laying the pipe onto a flat surface of the formed shell and merely spraying more metal over the pipe to stick it to the shell is unsuitable because such a process invariably results in the formation of air pockets between the shell and the underside of the pipes.

The process of the present invention avoids the formation of air pockets due to the particular method used for attaching the pipes to the metal shell. In this method, the pipe is first contoured if necessary so that it complies closely with the shape of the part of the model to which it is to be attached. Of course, if the part of the model to which the pipe is to be attached is flat, and the pipe itself is straight, then contouring will not be necessary. A layer of uncured epoxy resin, preferably a strip of said resin, is then deposited along the part of the model to which the pipe is to be attached and the pipe pressed into this uncured layer, which has the consistency of putty. It is preferable to press the pipe into the strip until it contacts the formed metal shell in order to achieve the best possible heat transfer characteristics in the finished mould. A wall of the uncured epoxy resin is then built up against each side of the pipe. This may be achieved simply by pressing the pipe deeply into the epoxide layer (if the layer is deep enough) so that the resin flows up and around each side of the pipe or (as is more usual) by carefully applying fresh quantities of resin along each side of the pipe. If desired, the walls may be built up so that they meet, wherein the pipe is completely encased in the epoxy resin.

The above procedure is repeated or carried out contemporaneously for each pipe which is to be attached to the metal shell. It is preferable in our process to deposit a number of layers of the uncured epoxy resin in the form of strips onto said shell, each strip corresponding to a pipe which is to be attached to the shell. However, it is within the scope of our invention for one deposited layer to serve for more than one pipe which is attached to the shell or even for all the pipes to be attached.

After attaching each pipe and after allowing the epoxy resin to harden to a sufficient extent, and preferably after allowing it to be completely cured, the shell is backed with at least one reinforcing layer so that the pipes and epoxy resin are encased whilst leaving their ends exposed. Due to the build up of epoxy resin round the pipes, void formation adjacent the shell may easily be prevented when applying the reinforcing backing.

As mentioned hereinbefore, thermocouples may also be attached to the metal shell at the same time as the pipes are attached. The method of attachement may, if desired, be exactly analogous to that of the attachment of the pipes. However, it is usually not necessary to build up a wall of epoxy resin against each side of the part of the thermocouple wire which contacts the metal shell, and merely pressing the contacting part of the thermocouple into a spot of such resin deposited on the shell usually suffices. This is because the thermocouple wires are of very much smaller diameter (normally less than one-eighth inch and often about one-sixteenth inch) than the cooling or heating pipes and moreover usually only contact the shell over a very short length (e.g. over about one-eighth inch) whereas the cooling or heating pipes generally extend right across the mould. The problem of avoiding air pockets when attaching thermocouples is therefore much less of a difficulty and usually merely tacking the thermocouple into a spot of resin is sufficient to avoid the formation of such pockets in the finished mould.

The nature of the reinforcing material depends upon the use to which the mould is to be put. The degree of reinforcing required depends upon the moulding operation. For example, if injection moulding techniques are used a high degree of reinforcement is required as the mould must withstand high pressures. In other moulding operations such as blow moulding it is not essential that the mould be so strong. We have found it particularly convenient to provide a first reinforcing layer around the metal shell so that the shell may readily be removed from the model and easily transported. This reinforced shell may then be backed with a further reinforcing layer to enable it to be used in moulding operations. The first reinforcing layer may conveniently be formed by surrounding the shell with the pipes adhering thereto with shuttering to form a cavity into which the first reinforcing material may be cast. For example wood shuttering may be mounted on the baseboard on which the model stands so that the cooling pipes protrude through the shuttering. Steel tie bars may then be bent and fitted to criss-cross the formed box and allowed to protrude each side. The rods serve two purposes, they provide means for transporting the backed metal shell and they also help to tie the shell into the second reinforcing layer. If the metal shell has been produced by spraying it is advisable to coat it with a water repellent paint before it is backed with the first reinforcing layer. We have found that concrete or aluminous cement are particularly suitable materials to cast into the cavity formed by the shuttering to cover the shell and provide the first reinforcing layer. We prefer that the whole system be well vibrated to ensure there are no voids in the reinforcing layer. When the backing material has cured the reinforced shell may be parted from the model. This reinforced shell will henceforth be referred to as the cavity insert.

The next step is to provide a second backing layer to the cavity insert. As previously stated the nature and extent of the backing depends on the use for and size of the mould. For small moulds the metal shell with cooling pipes and thermocouples attached can conveniently be positioned in a wood or metal bolster frame which is then filled with the backing material which is preferably concrete. The bolster would be assembled on a flat surface when casting the concrete around the cavity insert and we prefer that the surface is covered with a plastic film to give a good finish to the concrete and act as a release agent. A further advantage of providing the reinforcement in two stages is that any cracks which may appear in the outermost layer will not propagate into the other layers. If the moulds are to be used in injection moulding, we prefer that metal blocks be positioned at each corner of the bolster as is described in our copending U.S. Pat. application No. 886,690, now abandoned. The size of the metal blocks will depend on the moulding machine being used and the size of the moulding being produced.

If the process of the present invention is used to produce split moulds for injection moulding, the shell of the second mould half may conveniently be prepared by inverting the first mould half and using the cavity as a spraying cradle to produce the metal shell for the other mould half. An angled beading is preferably fitted around the top of the inverted shell to provide a key for the sprayed metal as is described in our U.S. Pat. No. 3,638,299. Before any metal is sprayed into the cavity material is deposited on the shell of first mould half to the required thickness to define the mould cavity.

Where the moulds are used for injection moulding a tapered hole called the sprue through which the polymer may be injected into the mould must be formed in the mould wall. Conveniently a metal block may be accurately positioned on the cavity defining material before the metal is sprayed so that the block may be later drilled and reamed to provide the sprue. Metal may then be sprayed to the required thickness on to the wax around the metal block to form the shell for the second mould half and the pipes already fitted to the cavity insert can now be used to cool the system when spraying. Alternatively the metal block may be positioned behind the shell and a hole drilled through the two to form the sprue; if this technique is adopted care must be taken to avoid cracking the shell.

Pipes and thermocouples should then be fitted to the second sprayed shell, in the same way as for the cavity insert. Thus the pipes may conveniently be attached as hereinbefore described with a metal filled epoxy resin to ensure good heat transfer and if desired, the adhesion may be improved by spraying metal around the pipes. Wooden shuttering together with strengthening rods may then be fixed around the shell and a block of metal positioned to form an extension of the sprue block positioned on the wax. The block should extend beyond the level to which the reinforcement will be cast so that it may be drilled out to provide the sprue. Reinforcing material such as concrete or aluminous cement may then be cast around the shell and allowed to cure so that it is self supporting. The concrete level should be below the top of the metal block.

As stated above if the two mould halves are to be used to produce large mouldings in machines which exert a large force during moulding they must be provided with a pressure resistant backing such as concrete and provided with means whereby they may be located on a moulding machine. This may be conveniently achieved by mounting each of the mould halves in a bolster which is then filled with reinforcing material, preferably concrete. The bolster should have walls of sufficient height to support the reinforcing material to the required depth, and the pipes should be of sufficient length that they extend to the outside of the bolster. The means whereby the moulds may be located on the moulding machine conveniently comprise metal blocks which may be located within the bolster, preferably at the corners, where they will be embedded in the reinforcing material, as is described in our copending U.S. Pat. application No. 886,690. Alternatively the blocks may be secured to the outside of the bolster. It is of course, important that the two mould halves be correctly positioned with the bolsters with respect to each other. We find that one mould half may conveniently be correctly positioned within the bolster by providing supports in the bolster so that when the insert rests on the supports it will be at the required height within the bolster and filling the bolster to above the height of the supports with liquid settable reinforcing material. The mould half may then be lowered down into the reinforcing material and allowed to settle until it comes to rest on the supports. The pipes and thermocouple leads being led through holes in the walls of the bolster. After the mould half has settled the bolster is finally filled with reinforcing material to surround the mould half.

An injection mould is generally positioned on a moulding machine by a locating ring which aligns the mould with the nozzle of the injection unit. Conveniently the locating ring which is generally a metal block is accurately positioned in the bolster so that it is held in the desired position by the concrete. In a preferred form the locating ring consists of several steel rods fitted to the centre of the cylindrical block and extending radially therefrom so as to distribute any forces which may be exerted on the locating ring over a large area of concrete. The material flowing through the injection nozzle of the moulding machine also exerts a substantial force on this area and thus it is preferred that the steel rods distribute these forces out to the bolts holding the mould on the machine platens.

It is finally necessary to mount the second mould half in its reinforcing material and at the same time ensure that the two halves mate together whilst providing a mould cavity of the required depth. The second mould half may conveniently be located within a bolster which is then filled with concrete so that the mould half is "floating" on the concrete and is higher than its final required position. The first mould half in its bolster is then lowered on to the second half so that the mould insert in the second half is depressed to the required depth in the concrete. The position of the second mould half will thus be defined by the position of the first mould half in its bolster. In a preferred method the two mould halves are located in the correct position with respect to each other by means of the metal blocks provided in the corners of the bolsters as is described in our copending U.S. Pat. application No. 886690, the blocks in one mould half being provided with dowels and the blocks in the other mould half with holes to receive the dowels so that when the dowels lock with the holes the two mould halves are correctly positioned. Alternatively the blocks on one mould half may be provided with guide plates within which the dowels of the other mould half slide to ensure that the blocks contact when the mould closes.

The second mould half settles down in the concrete to the required depth and the concrete allowed to set. Finally, the metal blocks defining the line of the sprue must be drilled out to form the channel along which material may be injected into the mould and the mould mounted on the moulding machine.

The present invention is illustrated but in no way limited by reference to the accompanying drawings in which FIG. 1 illustrates the model which is used in the production of the cavity insert.

Figure 1:
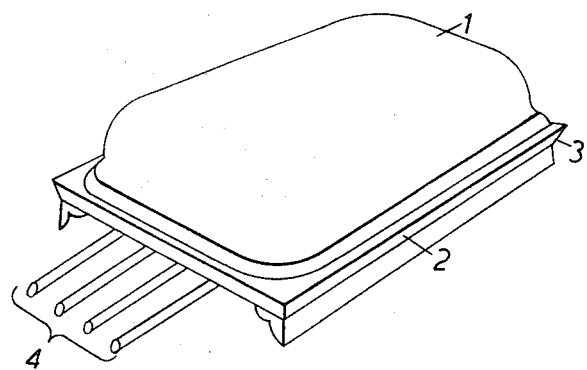
Figure 2:
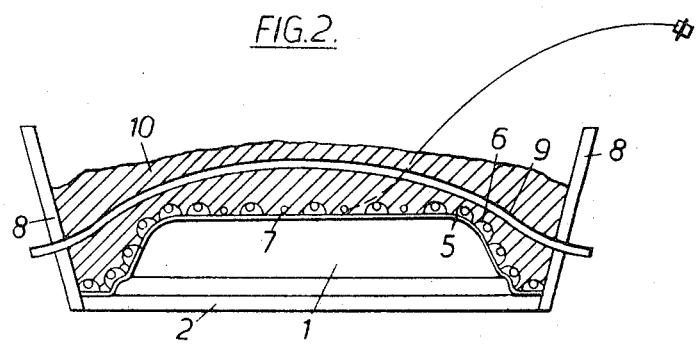
FIG. 2 illustrates the model coated with a metal shell which is provided with a rigid backing material.

With respect to FIG. 1 the model 1 is mounted on a wooden base board 2 which has an angled edge 3 which will key the metal shell to the model. Cooling pipes 4 are provided at the back of the model to keep the surface of the model cold during spraying and thus enhance the setting of the sprayed metal coating. As is illustrated in FIG. 2 the model is first spray coated with a layer of metal 5 to which are secured pipes 6 by the method hereinbefore described and thermocouples 7 which have been secured by tacking them to spots of resin deposited on the shell. The sprayed model is then surrounded by shuttering 8 through which the ends of the pipes and the thermocouples extend. Metal keying rods 9 are bent to conform to the shape of the model within the shuttering so that when the aluminous cement 10 has set the mould half may be removed from the model and inverted as is shown in FIG. 3 where one may see the mould cavity 11.

Figure 3:
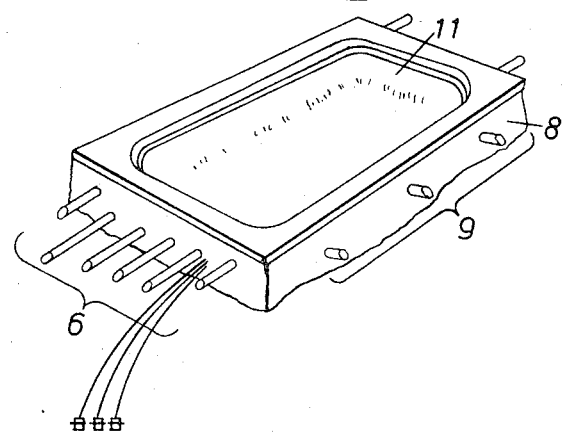
FIG. 3 illustrates the mould half shown in FIG. 2 removed from the model and inverted.
Figure 4:
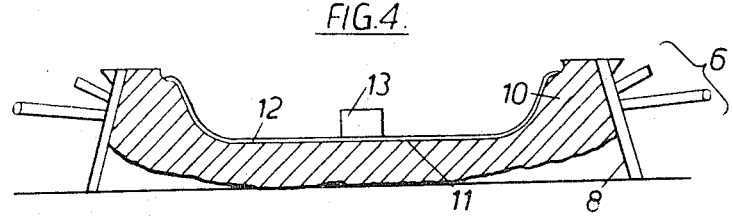
FIG. 4 illustrates the method of preparing the mould half illustrated in FIG. 3 as a model for the production of the other mould half.
Figure 5:
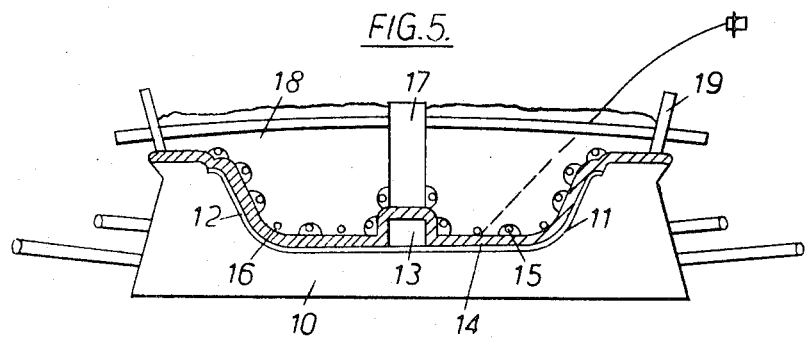
FIG. 5 illustrates the formation of the other mould half.

The cavity insert illustrated in FIG. 3 is then used as the model for the production of the other mould half as is shown in FIG. 4. The surface 11 of the cavity insert is first coated with a layer of wax 12 to the thickness required for the mould cavity. A metal block 13 is then positioned on top of the wax in the position where the sprue is to be formed in the mould. The wax coated mould half is then sprayed with a metal layer 14 to form the other mould half as is illustrated in FIG. 5; thermocouples 16 and pipes 15 are then secured to the back of the metal shell by a metal filled epoxy resin adhesive in the same manner as those on the cavity insert. A metal block 17 is also provided behind the block 13, shuttering 19 placed around the edges of the sprayed metal shell and aluminous cement 18 cast around to back the shell while leaving the end of the metal block 17 exposed. The second mould half may then be removed from the first half and the two mould halves together with the thermocouples and cooling pipes firmly adhered thereto may be mounted in rigid reinforcement such as concrete ready for use on an injection moulding machine.

We claim:

1. A process for making moulds or mould halves comprising a) forming a shell of metal around a model of the article to be moulded, b) adhering heating or cooling pipes to the metal shell using a metal filled epoxy resin as adhesive by pressing each pipe along its length into a layer of uncured metal filled epoxy resin deposited on at least the portion of said shell to which said each pipe is applied and building up a wall of uncured metal filled epoxy resin against each side of said each pipe, and c) applying to said shell a reinforcing material to form a reinforcing backing on said shell and said pipes with said pipes and metal filled epoxy resin encased in the reinforcing backing (except at the ends of the pipes which are exposed) with the exclusion of air pockets adjacent the metal shell.

2. A process according to claim 1 wherein said layer of uncured metal filled epoxy resin is deposited as a strip onto said shell.

3. A process according to claim 1 wherein said each pipe is pressed into the deposited layer of epoxy resin until it contacts the metal shell.

4. A process according to claim 1 in which the metal shell is formed to a thickness of at least one-sixteenth inch.

5. A process according to claim 1 in which before formation of the shell the model is sprayed with a water soluble release agent.

6. A process according to claim 1 in which the metal shell is formed by metal spraying.

7. A process according to claim 1 in which the metal shell is formed by electrodeposition.

8. A process according to claim 1 in which the metal shell is made by flame spraying and is entirely of zinc.

9. A process according to claim 1 in which the metal shell is made by compressed air spraying and is of an alloy of bismuth and tin.

10. A process according to claim 1 in which the metal shell consists of a layer of zinc of minimum thickness 0.05 inch adjacent the model backed by a low carbon steel, copper or aluminum.

11. A process according to claim 1 in which the metal shell is about ¼ inch thick.

12. A process according to claim 1 in which the pipes are of copper.

13. A process according to claim 1 in which the pipes are stuck to the metal shell with a metal filled epoxy resin and a further metal coating is then sprayed over the pipes to enhance the adhesion and heat transfer between the pipes and the shell and to provide at least part of the reinforcing backing.

14. A process according to claim 1 in which thermocouples are also mounted on the metal shell.

15. A process according to claim 13 in which the thermocouples are stuck to the metal shell with a metal filled epoxy resin.

16. A process according to claim 1 in which the metal shell is backed with a first reinforcing layer before being removed from the model.

17. A process according to claim 15 in which the shell backed by the reinforcing layer is subsequently reinforced with a second layer.

18. A process for making moulds or mould halves for injection moulding processes comprising forming a shell of metal around a model of the article to be moulded, adhering heating or cooling pipes to the metal shell using a metal filled epoxy resin as adhesive and backing said shell to provide reinforcement to the shell and to encase the pipes whilst leaving their ends exposed.

19. A process according to claim 18 in which the metal shell is formed to a thickness of at least one-sixteenth inch.

20. A process according to claim 18 in which before formation of the shell the model is sprayed with a water soluble release agent.

21. A process according to claim 18 in which the metal shell is formed by metal spraying.

22. A process according to claim 18 in which the metal shell is formed by electrodeposition.

23. A process according to claim 18 in which the metal shell is made by flame spraying and is entirely of zinc.

24. A process according to claim 18 in which the metal shell is made by compressed air spraying and is of an alloy of bismuth and tin.

25. A process according to claim 18 in which the metal shell consists of a layer of zinc of minimum thickness 0.05 inch adjacent the model backed by a low carbon steel, copper or aluminium.

26. A process according to claim 18 in which the metal shell is about ¼ inch thick.

27. A process according to claim 18 in which the pipes are of copper.

28. A process according to claim 18 in which the pipes are stuck to the metal shell with a metal filled epoxy resin and a further metal coating is then sprayed over the pipes to enhance the adhesion and heat transfer between the pipes and the shell.

29. A process according to claim 18 in which thermocouples are also mounted on the metal shell.

30. A process according to claim 29 in which the thermocouples are stuck to the metal shell with a metal filled epoxy resin.

31. A process according to claim 18 in which the metal shell is backed with a first reinforcing layer before being removed from the model.

32. A process according to claim 31 in which the shell backed by the reinforcing layer is subsequently reinforced with a second layer.

33. A mould comprising a metal shell defining a moulding surface with cooling pipes stuck to the reverse side thereof by means of a metal filled epoxy resin and backed with a reinforcing material which encases the cooling pipes while leaving their ends exposed.

34. A mould according to claim 33 in which the metal shell is at least 1/16 inch thick.

35. A mould according to claim 33 in which the pipes are copper pipes.

36. A mould according to claim 33 in which the reinforcing material consists of a first layer applied to render the shell self supporting and a second layer to enable the mould to withstand moulding pressures.

37. A mould comprising a metal shell defining a moulding surface with cooling pipes stuck to the non-moulding side thereof by means of a metal filled epoxy resin and backed with a reinforcing material which encases the cooling pipes with the exclusion of air pockets adjacent the metal shell while leaving their ends exposed.

38. A mould according to claim 37 in which the reinforcing material comprises a first layer to render the shell self-supporting and a second layer to enable the mould to withstand moulding pressures.

* * * * *

UNITED STATES PATENT OFFICE
CERTIFICATE OF CORRECTION

Patent No. 3,784,152    Dated January 8, 1974

Inventor(s) PAUL JOHNSON GARNER and THOMAS ROBERT STEPHEN COLLINS

It is certified that error appears in the above-identified patent and that said Letters Patent are hereby corrected as shown below:

On the face of the Patent, please make the following changes:

After [75] Inventors: Paul Johnson Garner, change "Thorp" to --Thorpe--

Under "[21]" add this paragraph:

--[30] Foreign Application Priority Data
December 30, 1968    Great Britain    885,172 --

Signed and sealed this 17th day of September 1974.

(SEAL)
Attest:

McCOY M. GIBSON JR.            C. MARSHALL DANN
Attesting Officer              Commissioner of Patents

UNITED STATES PATENT OFFICE
CERTIFICATE OF CORRECTION

Patent No. 3,784,152                Dated January 8, 1974

Inventor(s) PAUL JOHNSON GARNER ET AL.

It is certified that error appears in the above-identified patent and that said Letters Patent are hereby corrected as shown below:

Please add the following to the front page format after the serial number:

--[30]  Foreign Application Priority Data

December 30, 1968   Great Britain   61659/68

This certificate supersedes Certificate of Correction issued September 17, 1974.

Signed and sealed this 8th day of April 1975.

(SEAL)
Attest:

RUTH C. MASON
Attesting Officer

C. MARSHALL DANN
Commissioner of Patents
and Trademarks